UNITED STATES PATENT OFFICE.

WILLIAM L. ELKINS, OF PHILADELPHIA, PENNSYLVANIA.

IMPROVEMENT IN PAINTS FOR OIL-BARRELS, &c.

Specification forming part of Letters Patent No. 140,817, dated July 15, 1873; application filed June 26, 1873.

*To all whom it may concern:*

Be it known that I, WILLIAM L. ELKINS, of Philadelphia, county of Philadelphia and State of Pennsylvania, have invented a Composition intended to be used as Paint, of which the following is a specification:

The composition herein described is intended more especially for coating the outside of petroleum-barrels, but it is also useful for painting other things.

I take any desired quantity of white or colored lead or other metallic or mineral paint mixed with oil, of the usual consistency, and to this add rosin equal to about one-eighth by weight of said oil-paint, with enough benzine or turpentine to make the composition sufficiently liquid to be applied with a brush.

This composition forms what may be termed an oil-varnish, which, when applied to barrels or other objects, gives them a fine gloss, that is not materially affected by moisture or rough usage.

I claim—

The oil-varnish, consisting of metallic or mineral oil paint, rosin, and benzine or turpentine, compounded substantially as and for the purposes specified.

W. L. ELKINS.

Witnesses:
   W. W. DOUGHERTY,
   J. BING.